Aug. 7, 1956  R. E. UPHOFF  2,757,700
SLOTTED CANTING LOCK NUT
Filed Aug. 3, 1955
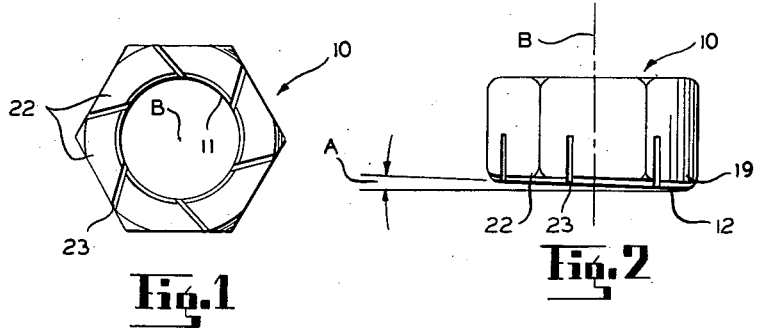
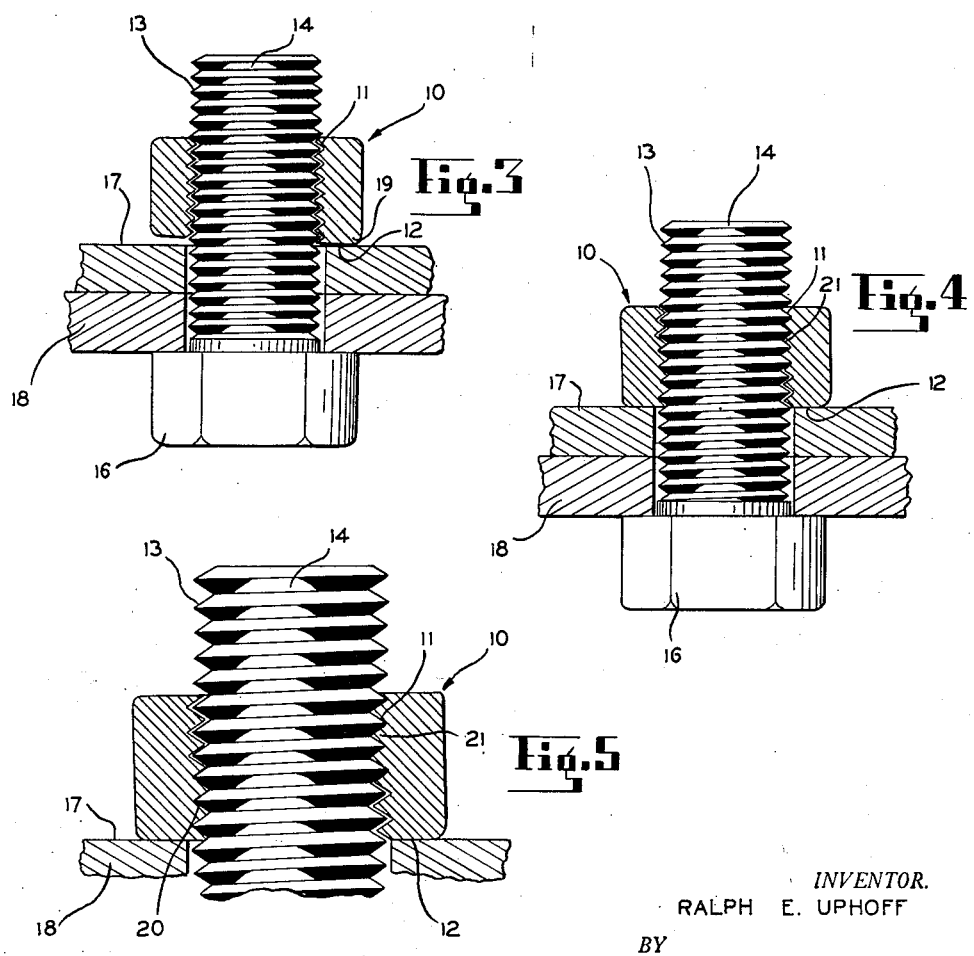
INVENTOR.
RALPH E. UPHOFF
BY
ATTORNEYS

United States Patent Office 2,757,700
Patented Aug. 7, 1956

2,757,700

SLOTTED CANTING LOCK NUT

Ralph E. Uphoff, Madison, Wis.

Application August 3, 1955, Serial No. 526,192

1 Claim. (Cl. 151—20)

This invention relates generally to lock nut constructions and more particularly to a self-locking nut conforming to standard measurements and sizes capable of being handled by conventional tools and particularly characterized by the formation on the bearing surface or end of the nut of a bevel extending across the full surface from outer edge to outer edge, thereby inclining the bearing surface with respect to the turning axis of the nut so that drawing the nut against an abutment surface normal to the turning axis will tip the nut and force the threads on opposite halves of the nut with great pressure into the threads of the bolt for producing a firm locking action of the nut upon the bolt.

It is an object of the present invention to provide an improved lock nut structure.

A further object of the present invention is to provide a lock nut which is conveniently applied with conventional tools and which causes no appreciable damage on the threads of a bolt or stud to which the nut is applied.

Many other features, objects and additional advantages of the present invention will become manifest to those versed in the art upon making reference to the detailed description which follows and the accompanying sheet of drawings in which a preferred structural embodiment of a lock nut embodying the principles of the present invention is shown by way of illustrative example.

On the drawings:

Figure 1 is a plan view of a lock nut provided in accordance with the principles of the present invention;

Figure 2 is a side elevational view of the lock nut shown in Figure 1;

Figure 3 is a cross-sectional view with parts shown in elevation illustrating the lock nut of Figures 1 and 2 applied to a bolt;

Figure 4 is similar to Figure 3 but shows the lock nut drawn up tightly against an abutment surface; and Figure 5 is a fragmentary cross-sectional view generally similar to Figure 4 but illustrating in greater detail the locking action in accordance with the principles of the present invention.

As shown on the drawings:

In Figure 1 there is shown a lock nut 10 which may be of any desired shape or size and which may be equipped with either coarse or fine threads 11. In the particular example shown by way of illustration, the nut 10 is hexagonal in configuration.

In accordance with the principles of the present invention, the bottom of the nut or the end bearing surface indicated at 12 is beveled off across the full surface from outer edge to outer edge approximately one-half to three-quarters of one degree, the angle of bevel being indicated generally by the reference character A in Figure 2.

In other words, the bearing surface 12 is angularly offset with respect to the turning axis of the nut 10 which is indicated in Figures 1 and 2 by the reference character B. Thus, in a normal nut construction, the bearing surface would lie in a plane disposed in normal relationship to the turning axis B, however, in accordance with the principles of the present invention the bearing surface 12 is offset from such a normal plane by an amount equal to the angle of inclination indicated by the reference character A in Figure 2.

In the preferred form of the invention herein illustrated, this amount of offset is provided by beveling the bearing surface 12. It will be understood, of course, that such offset could likewise be provided by extending the bore of the nut 10 at an angle with respect to the end bearing surface of the nut, thus tipping the turning axis B an amount equal to the angle A.

The exemplary value of the angle A given as one-half to three-quarters of one degree is that used on a typical one inch nut. Under such circumstances, the thickness on one side of the one inch nut is greater than the thickness of the other side by approximately 0.025 inch, or nearly 1/32 of an inch. It will be understood by those versed in the art, however, that the degree of bevel, or the value of the angle A, will be determined as a function of the size of the bolt and nut and the class fit of the threads incorporated therein.

In Figure 3, the nut 10 is shown drawn onto the threads 13 of a bolt 14 having a head 16. For purposes of illustration, means providing an abutment surface 17 are indicated at 18 adjoining the head 16 of the bolt 14. Thus, the high side or thicker side of the nut identified by the separate reference numeral 19 for purposes of convenience, makes contact with the abutment surface 17 first when the nut 10 is axially advanced on the bolt 14 by the threading of the nut 10 thereon. This action is clearly illustrated in Figure 3 of the drawings wherein the high side 19 is shown in contact with the abutment surface 17.

Upon continued tightening of the nut, the high or thicker portion of the nut runs out away from the bolt 14. This "run out" is caused by the rotating pressure exerted between the different angle of the plane of the bearing surface 12 on the nut 10 and the plane of the stationary abutment surface 17. This sideways movement is accompanied by a tipping of the nut 10.

When the nut 10 is drawn completely down as is illustrated in Figure 4 and in greater detail in Figure 5, the threads of the lower half of the nut 10 as indicated by the reference numeral 20 (Figure 5) are forced with great pressure into the threads of the bolt. The same action takes place at the top of the nut on the opposite side as indicated generally by the reference numeral 21. This results in a firm locking of the nut upon the bolt.

In order to improve the resilience or spring action of the locking effect afforded by the principles of the present invention, the nut 10 is characterized by the provision of a plurality of equally spaced sections indicated at 22 (Figures 1 and 2). The sections 22 are provided by making saw cuts or by otherwise forming suitable slots 23 at a plurality of circumferentially spaced points in the walls of the nut 10. The slots 23 are preferably formed to extend to a depth of less than one-half of the thickness of the nut 10. Good results have been obtained by forming the slots to a depth of approximately 0.45 of the thickness of the nut 10.

It will be noted that the slots 23 are made on a straight line across the bore of the nut 10 about a half the distance from outside to the center of the bore. The slots 23 are located to slope away from the direction of rotation when the nut is tightened. This prevents the sharp points which result where the slot intersects the threads from tearing or galling when the nut 10 is drawn tightly on the bolt 14 and still permits a holding effect when the nut 10 is tight.

In operation, the nut 10 of the present invention acts like a normal nut in every respect when it is screwed upon a bolt or a stud until approximately the last one-quarter turn in the tightening sequence. At that point, the nut 10 tips or leans just enough to take up the play or tolerance between the nut 10 and the bolt 14 and causes the bolt 14 to place a tension on the walls of the nut 10.

It further appears that the tipping of the nut 10 changes the pitch of the threads 11 and 13 between the bolt 14 and the nut 10.

It also appears that the lead of the threads is changed. The nut 10 is not distorted, sprung or weakened and full thread engagement is maintained. Full bearing surface is also maintained and, accordingly, locking against accidental loosening is safeguarded. Thus, the nut is not only self-locking and will not be loosened by vibration or friction, but the nut conforms to standard measurements and sizes and can be turned on or off in the usual manner and can be handled efficiently by modern high-speed torque wrenches. Furthermore, repeated use has no effect upon the locking principle since the nut causes no damage to the threads of the bolt or stud upon which the nut is applied.

It may be noted that in a nut 10 wherein the nut is divided in a plurality of separate sections, the tightening of the nut on the bolt has the effect of dragging the sections over the abutment surface. This causes the sections to incline slightly away from the direction of rotation and provides a resistance against loosening which enhances the locking action of the nut.

Although various minor structural modifications might be suggested by those versed in the art, it should be understood that I wish to embody within the scope of the patent warranted hereon all such modifications as reasonably and properly come within the scope of my contribution to the art.

I claim as my invention:

A lock nut comprising a polygonal body having a plurality of flat side faces parallel to and concentrically outwardly of a center axis of said body, a first end face on said body extending generally transversely of said center axis, a second end face on said body disposed at an angle in the order of about one-half to three-quarters of one degree with respect to said center axis, said body having an open-ended bore formed on said center axis and extending between said first and second end faces, said bore having screw threads formed therein having a thread axis coinciding with said center axis, and a plurality of slots formed at a plurality of circumferentially spaced points in said second end face of said nut body to improve the resilience of the locking effect, said slots each extending to a depth of less than one-half of the distance between said first and second end faces, each slot extending on a straight line across said bore about one-half the distance from outside said nut body at said flat faces to the center of said bore and being angularly disposed with respect to said thread axis to slope away in a plane generally parallel to a plane tangential to said bore, and sloping away from the direction of rotation when the nut is tightened, thereby to prevent sharp points resulting where said slots intersect said screw threads from tearing or galling an adjoining screw-threaded surface, said nut tipping in response to said second end surface engaging an adjoining normal abutment surface, thereby to produce a self-locking action when said nut is tightened.

References Cited in the file of this patent

UNITED STATES PATENTS

| | | |
|---|---|---|
| 291,328 | Garvey | Jan. 1, 1884 |
| 900,796 | Tombling | Oct. 13, 1908 |
| 1,804,058 | Micha | May 5, 1931 |